United States Patent
Kim

(10) Patent No.: US 9,390,050 B2
(45) Date of Patent: Jul. 12, 2016

(54) DATA TRANSMISSION APPARATUS AND METHOD

(71) Applicant: SAMSUNG ELECTRONICS CO., LTD., Suwon (KR)

(72) Inventor: Je-ik Kim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 407 days.

(21) Appl. No.: 13/953,305

(22) Filed: Jul. 29, 2013

(65) Prior Publication Data

US 2014/0068123 A1 Mar. 6, 2014

(30) Foreign Application Priority Data

Aug. 31, 2012 (KR) ......................... 10-2012-0096331

(51) Int. Cl.
*G06F 13/42* (2006.01)
*G06F 13/38* (2006.01)

(52) U.S. Cl.
CPC .......... *G06F 13/4286* (2013.01); *G06F 13/385* (2013.01)

(58) Field of Classification Search
CPC ..... G06F 11/2294; G06F 13/102; G06F 3/00; G06F 13/42; H04L 67/14; H04L 61/00; H04W 4/005
USPC .................................. 710/106, 305–306, 105
See application file for complete search history.

(56) References Cited

U.S. PATENT DOCUMENTS

| | | | |
|---|---|---|---|
| 2006/0123166 A1* | 6/2006 | Toebes | H04L 67/14 710/106 |
| 2012/0102241 A1* | 4/2012 | Tamura | H04W 4/005 710/30 |
| 2012/0307727 A1* | 12/2012 | Yamada | H04L 45/586 370/328 |

FOREIGN PATENT DOCUMENTS

WO 2005/034052 A1 4/2005

OTHER PUBLICATIONS

Extended European Search Report mailed Aug. 27, 2014 in related European Application No. 13179204.6.
"IPP USB Specification (IPP over USB)", Version 1.0 Draft 19, Apr. 29, 2011, URL: ftp://ftp.pwg.orgjpubjpwgjippjwhitepaper-jdraftippusbspecification-20110428.pdf [retrieved on May 28, 2014], pp. 1-20.

* cited by examiner

*Primary Examiner* — Tim T Vo
*Assistant Examiner* — Kim T. Huynh
(74) *Attorney, Agent, or Firm* — Staas & Halsey LLP

(57) ABSTRACT

A data transmission apparatus and method are provided. The data transmission apparatus includes a USB interface unit that communicates with an external device using a TCP/IP packet, and a control unit that controls the USB interface unit to convert data into a TCP/IP packet along one of a plurality of transmission paths according to a priority of data processing and transmits the TCP/IP packet. Accordingly, data (e.g., control data) requiring urgent processing may be timely transmitted to an external device regardless of traffic of the data transmission apparatus.

11 Claims, 5 Drawing Sheets

DATA TRANSMISSION APPARATUS AND METHOD

CROSS-REFERENCE TO RELATED APPLICATIONS

This application is related to, and claims priority to Korean Patent Application No. 10-2012-0096331, filed on Aug. 31, 2012, in the Korean Intellectual Property Office, the disclosure of which is incorporated herein by reference in its entirety.

BACKGROUND

1. Field

Embodiments of the present disclosure relate to a data transmission apparatus and method, and more particularly, to an apparatus and method for generating a TCP/IP packet of diverse data and transmitting the TCP/IP packet through a USB interface.

2. Description of the Related Art

Diverse electronic devices may be embedded with an operating system (OS), and thus may provide diverse functions. Universal serial buses (USBs) are frequently used as an interface for data communication between diverse electronic devices. The USB supports fast and convenient connection between devices. For example, when peripherals are connected to a personal computer using a USB, the user can access all the peripherals using a single interface without installing software or hardware. Thus, the user is provided with convenience of use and with compact electronic devices t.

Ethernet over USB may be used, in which the USB is used as a physical medium, but actual transmission is performed using a transmission control protocol/internet protocol (TCP/IP) packet.

FIG. 1 illustrates a data transfer method of a data transmission apparatus through Ethernet over USB.

The data transmission apparatus receives diverse data such as content data and control data, and subsequently generates a TCP/IP packet for both the content data and the control data using a TCP/IP driver 10. The data transmission apparatus processes the TCP/IP packet using an Ethernet driver 20 and an Ethernet Emulation Model (EEM) driver 30 so that the TCP/IP packet may be transmitted through an USB interface 40. Lastly, the data transmission apparatus transmits the TCP/IP packet to an external device through the USB interface 40 in a bulk transmission scheme.

Regardless of the type of data, all the data are processed into a single TCP/IP packet and are transmitted to an external device in a bulk transmission scheme.

If there is no traffic in the data transmission apparatus when data needed to be urgently processed, such as control data, are transmitted, the data transmission apparatus can transmit the urgent data within a limited period of time. However, if traffic of the data transmission apparatus is increasing, the urgent data may not be transmitted to the external device promptly. Accordingly, a solution is required.

SUMMARY

Additional aspects and/or advantages will be set forth in part in the description which follows and, in part, will be apparent from the description, or may be learned by practice of the invention.

Exemplary embodiments of the present invention address the above problems and/or disadvantages and/or other disadvantages not described above.

An aspect of the present invention provides a data transmission apparatus and method for processing and transmitting data along different transmission paths according to a priority of data processing so that data requiring urgent processing can be transmitted to an external device within a predetermined time regardless of the traffic of the data transmission apparatus.

According to an exemplary aspect of the present invention, a data transmission apparatus is provided including a universal serial bus (USB) interface unit which communicates with an external device using a transmission control protocol/Internet protocol (TCP/IP) packet, and a control unit which controls the USB interface unit to convert data into a TCP/IP packet along one of a plurality of transmission paths according to a priority of data processing and transmits the TCP/IP packet.

Upon first data having a high priority of data processing, the control unit may convert the first data into a TCP/IP packet along a first transmission path and transmit the TCP/IP packet to the external device through the USB interface unit. Upon second data having a low priority of data processing, the control unit may convert the second data into a TCP/IP packet along a second transmission path and transmit the TCP/IP packet to the external device through the USB interface unit.

The control unit may allocate a different TCP/IP address to the first transmission path and the second transmission path.

The control unit may emulate a different virtual MAC address to the first transmission path and the second transmission path.

The TCP/IP packet generated along the first transmission path may be transmitted to the external device in an interrupt transfer method, and the TCP/IP packet generated along the second transmission path may be transmitted to the external device in a bulk transfer method.

The first data may be at least one of control data and remote procedure call (RPC) data, and the second data may be content data.

The first data may be transmitted to the external device within 125 us along the first transmission path regardless of whether the second data are transmitted.

According to another exemplary aspect of the present invention, a data transmission method is provided including converting data into a TCP/IP packet along one of a plurality of transmission paths according to a priority of data processing, and transmitting the TCP/IP packet through a USB interface unit.

In the converting of the data into the TCP/IP packet, upon first data having a high priority of data processing, the first data may be converted into a TCP/IP packet along a first transmission path. Upon second data having a low priority of data processing, the second data may be converted into a TCP/IP packet along a second transmission path.

In the converting of the data into the TCP/IP packet, a different TCP/IP address may be allocated to the first transmission path and the second transmission path.

In the converting of the data into the TCP/IP packet, a different virtual MAC address may be emulated to the first transmission path and the second transmission path.

In the transmitting of the TCP/IP packet, the TCP/IP packet generated along the first transmission path may be transmitted to an external device in an interrupt transfer method, and the TCP/IP packet generated along the second transmission path may be transmitted to the external device in a bulk transfer method.

The first data may be at least one of control data and remote procedure call (RPC) data, and the second data may be content data.

The first data may be transmitted to an external device within 125 us along the first transmission path regardless of whether the second data are transmitted.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION

Figure 1:
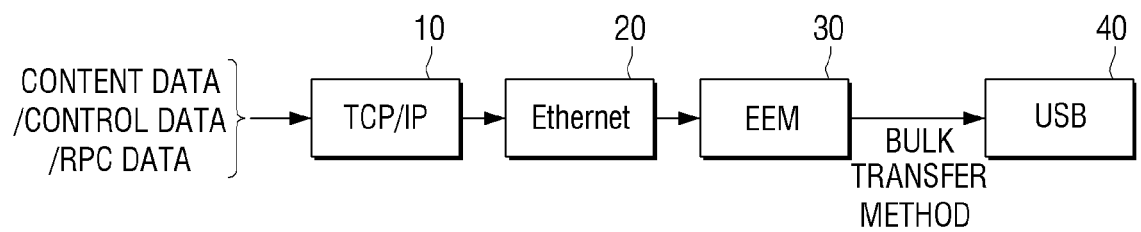
FIG. 1 illustrates driver configuration of a related art data processing apparatus.

Exemplary embodiments of the present invention are described in greater detail with reference to the accompanying drawings.

The same drawing reference numerals are used for similar elements, even in different drawings. The disclosed detailed construction and elements is provided to assist in a comprehensive understanding of the invention.

Figure 2:
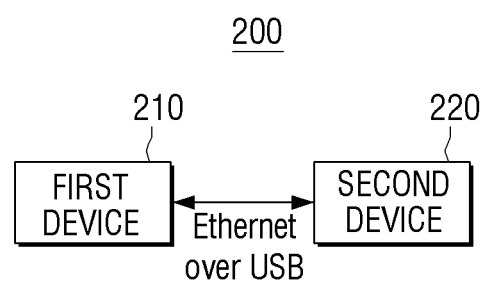
FIG. 2 illustrates a data transmission system using an Ethernet over USB according to an exemplary embodiment of the present invention.

FIG. 2 illustrates a data transmission system using an Ethernet over a USB according to an exemplary embodiment of the present invention. As illustrated in FIG. 2, the data transmission system 200 may include a first device 210, and a second device 220 connected to the first device 210 through Ethernet over USB.

The first device 210 and the second device 220 may be implemented as a personal computer and a peripheral, as an exemplary embodiment. The first device 210 and the second device 220 may be implemented as diverse devices such as a television and a device providing a smart function.

The first device 210 and the second device 220 may perform distributed processing between their CPUs in a remote procedure call (RPC) scheme. The RPC scheme is a scheme for calling a subroutine or a procedure in another separated device. Distributed processing between the CPUs of the two devices may be enabled using the RPC scheme.

The first device 210 and the second device 220 may transmit and receive data through Ethernet over USB. The Ethernet over USB indicates a USB capable of functioning as Ethernet network. The Ethernet over USB uses a USB as a physical medium, but substantially transmits and receives data using a TCP/IP packet.

A data transmission apparatus using Ethernet over USB is disclosed.

Figure 3:
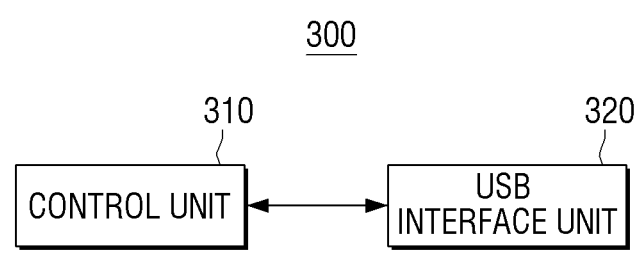
FIG. 3 illustrates a data transmission apparatus according to an exemplary embodiment of the present invention.

FIG. 3 illustrates a data transmission apparatus according to an exemplary embodiment of the present invention. As illustrated in FIG. 3, the data transmission apparatus 300 according to an exemplary embodiment of the present invention may include a control unit 310 and a USB interface unit 320.

The control unit 310 controls the overall operation of the data transmission apparatus 300. The control unit 310 controls the USB interface unit 320 to generate a TCP/IP packet of data and transmit the generated TCP/IP packet along a different transmission path according to the priority of data processing.

Upon first data having a high priority of data processing, the control unit 310 may generate a TCP/IP packet of the first data along a first transmission path and transmit the TCP/IP to an external device through the USB interface unit 320. Upon second data having a low priority of data processing, the control unit 310 may generate a TCP/IP packet of the second data along a second transmission path and transmit the TCP/IP to an external device through the USB interface unit 320.

The first data may be at least one of control data and RPC data which are needed to be urgently processed. The second data may be high-capacity content data such as moving image content, music content, picture content, etc.

The control unit 310 may allocate a different TCP/IP address to the TCP/IP packet of the first data generated along the first transmission path and to the TCP/IP packet of the second data generated along the second transmission path, respectively.

The control unit 310 may emulate a different virtual Media Access Control (MAC) address to the TCP/IP packet of the first data generated along the first transmission path and to the TCP/IP packet of the second data generated along the second transmission path, respectively.

The control unit 310 according to an exemplary embodiment of the present invention may be implemented with a central processing unit (CPU).

The USB interface unit 320 transmits the TCP/IP packet generated by the control unit 310 to an external device. The USB interface unit 320 may transmit the TCP/IP packet to the external device in a different transfer method according to the transmission path.

The USB interface unit 320 may transmit a packet in four transfer methods.

A control transfer method is used to build and maintain communication between a host and a device by the device transferring configuration information to the host.

An interrupt transfer method has features of low communication period and a limited delay, and is used when an instant response to a small amount of data such as a keyboard or a mouse is necessary.

A bulk transfer method may be used for accidental and a periodic transmission and for data transmission using all the available bandwidths. If there is no available bandwidth, there may be a delay until a bandwidth is available. A bulk data transfer mode may be used for a device that has a large amount of data but does not require real-time processing and thereby is capable of having a delay time.

An isochronous transfer method for continuous and periodic transmission between a host and a device may be used for transmission of time-related information and requires a reserved bandwidth.

Ethernet over USB may transmit all data in the bulk transfer method regardless of the type of data, and cause transmission delay of control data requiring instant processing or RPC data if traffic occurs in the USB communication.

However, according to an exemplary embodiment of the present invention, the USB interface unit 320 may transmit the TCP/IP packet generated along the first transmission path to an external device using the interrupt transfer method that is capable of instant transmission, and may transmit the TCP/IP packet generated along the second transmission path to an external device using the bulk transfer method of high-speed.

The USB interface unit 32 may insert the first data by the micro frame of 125 us in the interrupt transfer method and thereby transmit the first data to an external device using a micro frame of 125 us regardless of whether other data are transmitted.

Using the data transmission apparatus 300, data requiring prompt processing may be timely transmitted to the external device in the interrupt transfer method.

Figure 4:
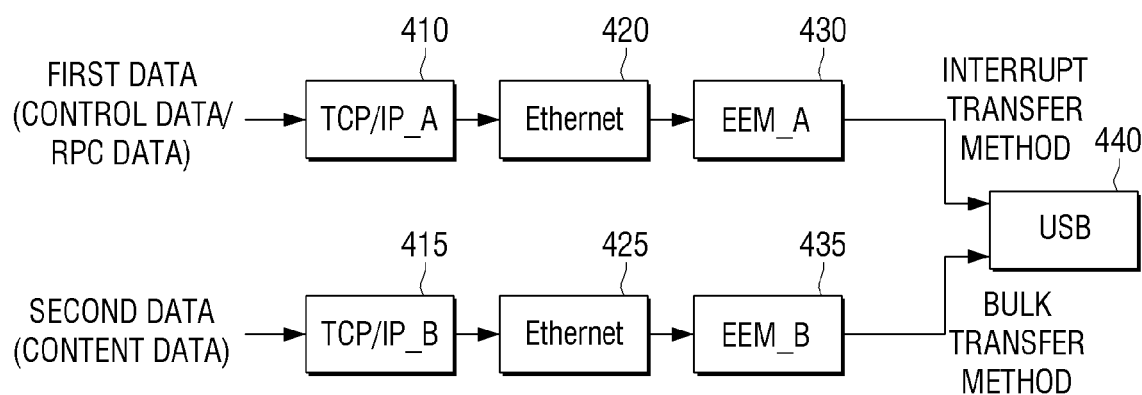
FIG. 4 illustrates a driver configuration of a data transmission apparatus according to an exemplary embodiment of the present invention.

FIG. 4 illustrates a driver configuration of a data transmission apparatus according to an exemplary embodiment of the present invention.

As illustrated in FIG. 4, the data transmission apparatus 300 according to an exemplary embodiment of the present invention may transmit control data and RPC data, which require urgent processing, and content data, which do not require urgent processing, to an external device using different transmission paths.

When transmitting a first data (e.g. control data or RPC data) requiring urgent processing to an external device, the control unit 310 converts the first data into a TCP/IP packet using a TCP/IP_A driver 410. The control unit 310 may allocate a first TCP/IP address to the TCP/IP packet. The control unit 310 processes the TCP/IP packet in a packet form of a physical layer using an Ethernet driver. The control unit 310 processes the TCP/IP packet using an EEM_A driver 430 so that the TCP/IP packet may be transmitted via the USB interface unit 320. The control unit 310 may emulate a first vertical MAC address to the TCP/IP packet of the first data. The control unit 310 may transmit the TCP/IP packet of the first data to the external device through the USB interface unit 320 in the interrupt transfer method.

When transmitting a second data (e.g. mass content data) that do not require urgent processing to an external device, the control unit 310 converts the second data into a TCP/IP packet using a TCP/IP_B driver 415. The control unit 310 may allocate a second TCP/IP address, which is different from the first TCP/IP address, to the TCP/IP packet. The control unit 310 processes the TCP/IP packet in a packet form of a physical layer using an Ethernet driver. The control unit 310 processes the TCP/IP packet using an EEM_B driver 435 so that the TCP/IP packet may be transmitted via the USB interface unit 320. The control unit 310 may emulate a second virtual MAC address, which is different from the first MAC address, to the TCP/IP packet of the second data. The control unit 310 may transmit the TCP/IP packet of the second data to the external device through the USB interface unit 320 in the bulk transfer method.

Figure 5:
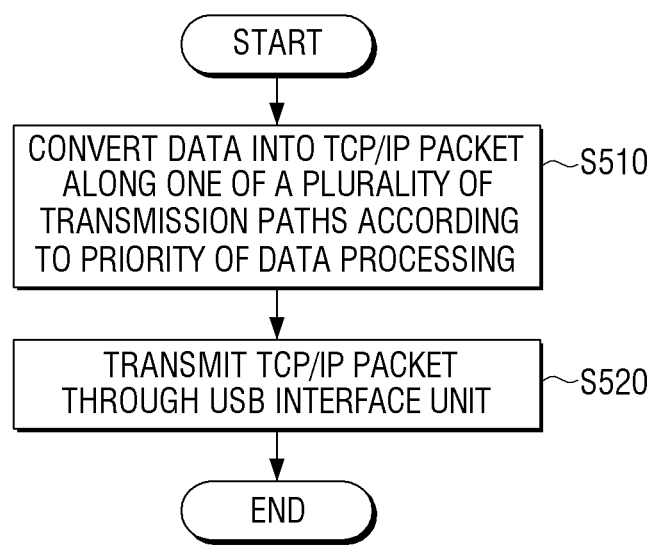
FIG. 5 illustrates a data processing method of a data processing apparatus according to an exemplary embodiment of the present invention.

A data transfer method of a data transmission apparatus is described with reference to FIG. 5.

In operation S510, the data transmission apparatus 300 converts data into a TCP/IP packet along one of a plurality of transmission paths according to the priority of data processing.

When transmitting first data (e.g. control data or RPC data) having a high priority of data processing, the data transmission apparatus 300 converts the first data into a TCP/IP packet along a first transmission path and transmits the TCP/IP packet to an external device through the USB interface unit 320. When transmitting second data (e.g. mass content data) having a low priority of data processing, the data transmission apparatus 300 converts the second data into a TCP/IP packet along a second transmission path and transmits the TCP/IP packet to the external device through the USB interface unit 320.

The data transmission apparatus 300 may allocate a different TCP/IP address to the TCP/IP packet of the first data and the TCP/IP packet of the second data, and may emulate a different virtual MAC address to the TCP/IP packet of the first data and the TCP/IP packet of the second data.

In operation S520, the data transmission apparatus 300 transmits the TCP/IP packets through the USB interface unit 320.

The data transmission apparatus 300 may transmit the TCP/IP packet generated along the first transmission path to the external device using the interrupt transfer method, and may transmit the TCP/IP packet generated along the second transmission path to the external device using the bulk transfer method.

According to the exemplary embodiment of the present invention, data requiring urgent processing (e.g. control data) can be timely transmitted to an external device regardless of traffic of the data transmission apparatus 300 by transmitting the data to the external device in a separate transfer method.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A data transmission apparatus, comprising:
   a universal serial bus (USB) interface unit that communicates with an external device using a transmission control protocol/Internet protocol (TCP/IP) packet; and
   a control unit that controls the USB interface unit to convert data into a TCP/IP packet along one of a plurality of transmission paths according to a priority of data processing and transmits the TCP/IP packet,
   wherein upon first data having a high priority of data processing, the control unit converts the first data into a TCP/IP packet along a first transmission path and transmits the TCP/IP packet to the external device through the USB interface unit, and
   upon second data having a low priority of data processing, the control unit converts the second data into a TCP/IP packet along a second transmission path and transmits the TCP/IP packet to the external device through the USB interface unit,
   wherein the control unit emulates a different virtual MAC address to the first transmission path and the second transmission path.

2. The data transmission apparatus according to claim 1, wherein the control unit allocates a different TCP/IP address to the first transmission path and the second transmission path.

3. The data transmission apparatus according to claim 1, wherein the TCP/IP packet generated along the first transmission path is transmitted to the external device in an interrupt transfer method, and
   the TCP/IP packet generated along the second transmission path is transmitted to the external device in a bulk transfer method.

4. The data transmission apparatus according to claim 1, wherein the first data are at least one of control data and remote procedure call (RPC) data, and the second data are content data.

5. The data transmission apparatus according to claim 1, wherein the first data are transmitted to the external device within 125 us along the first transmission path regardless of whether the second data are transmitted.

6. A data transmission method, comprising:
   converting data into a TCP/IP packet along one of a plurality of transmission paths according to a priority of data processing; and
   transmitting the TCP/IP packet through a USB interface unit,
   wherein the converting of the data into the TCP/IP packet comprises,
      upon first data having a high priority of data processing, the first data are converted into a TCP/IP packet along a first transmission path, and
      upon second data having a low priority of data processing, the second data are converted into a TCP/IP packet along a second transmission path,
   wherein in the converting of the data into the TCP/IP packet, a different virtual MAC address is emulated to the first transmission path and the second transmission path.

7. The data transmission method according to claim 6, wherein in the converting of the data into the TCP/IP packet, a different TCP/IP address is allocated to the first transmission path and the second transmission path.

8. The data transmission method according to claim 6, wherein in the transmitting of the TCP/IP packet, the TCP/IP packet generated along the first transmission path is transmitted to an external device in an interrupt transfer method, and
   the TCP/IP packet generated along the second transmission path is transmitted to the external device in a bulk transfer method.

9. The data transmission method according to claim 6, wherein the first data are at least one of control data and remote procedure call (RPC) data, and
   the second data are content data.

10. The data transmission method according to claim 6, wherein the first data are transmitted to an external device within 125 us along the first transmission path regardless of whether the second data are transmitted.

11. A control device for a data transmission apparatus, comprising:
   a processor that controls an interface device to convert data into a data packet along one of a plurality of transmission paths according to a priority of data processing and outputs the data packet,
   wherein upon first data having a high priority of data processing, the processor converts the first data into a TCP/IP packet along a first transmission path and transmits the TCP/IP packet to the external device through the interface device, and
   upon second data having a low priority of data processing, the processor converts the second data into a TCP/IP packet along a second transmission path and transmits the TCP/IP packet to the external device through the interface device,
   wherein the processor emulates a different virtual MAC address to the first transmission path and the second transmission path.

* * * * *